US 9,075,621 B2

(12) United States Patent
Schon et al.

(10) Patent No.: US 9,075,621 B2
(45) Date of Patent: Jul. 7, 2015

(54) ERROR RECOVERY UPON REACHING OLDEST INSTRUCTION MARKED WITH ERROR OR UPON TIMED EXPIRATION BY FLUSHING INSTRUCTIONS IN PIPELINE PENDING QUEUE AND RESTARTING EXECUTION

(75) Inventors: Guillaume Schon, Golfe Juan (FR);
Mélanie Emanuelle Lucie Teyssier, Grasse (FR); Frederic Claude Marie Piry, Cagnes-sur-Mer (FR); Luca Scalabrino, Biot (FR); David Michael Bull, Balsham (GB)

(73) Assignee: ARM Limited, Cambridge (GB)

( * ) Notice: Subject to any disclaimer, the term of this patent is extended or adjusted under 35 U.S.C. 154(b) by 865 days.

(21) Appl. No.: 13/336,432

(22) Filed: Dec. 23, 2011

(65) Prior Publication Data
US 2013/0166952 A1 Jun. 27, 2013

(51) Int. Cl.
*G06F 9/38* (2006.01)
*G06F 11/07* (2006.01)
*G06F 11/14* (2006.01)

(52) U.S. Cl.
CPC ............ *G06F 9/3865* (2013.01); *G06F 9/3861* (2013.01); *G06F 9/3855* (2013.01); *G06F 11/1405* (2013.01); *G06F 11/1497* (2013.01); *G06F 11/0736* (2013.01); *G06F 11/0757* (2013.01)

(58) Field of Classification Search
None
See application file for complete search history.

(56) References Cited

U.S. PATENT DOCUMENTS

| 5,961,636 A | 10/1999 | Brooks et al. |
| 6,212,619 B1 | 4/2001 | Dhong et al. |
| 6,230,262 B1 | 5/2001 | Witt |
| 6,625,756 B1 * | 9/2003 | Grochowski et al. ........... 714/17 |
| 6,981,261 B2 | 12/2005 | Kalafatis et al. |
| 7,127,592 B2 | 10/2006 | Abraham et al. |
| 7,325,078 B2 | 1/2008 | Walker et al. |
| 2013/0007418 A1 * | 1/2013 | Fleischman et al. .......... 712/216 |

OTHER PUBLICATIONS

Bowman et al., "A 45 nm Resilient Microprocessor Core for Dynamic Variation Tolerance", *IEEE Journal of Solid-State Circuits*, vol. 46, No. 1, Jan. 2011, pp. 194-208.

Tsuchanz et al., "Adaptive Frequency and Biasing Techniques for Tolerance to Dynamic Temperature-Voltage Variations and Aging", *ISSCC 2007*, Session 16, 16.4, 2007, pp. 292-293 & 604.

(Continued)

*Primary Examiner* — Kenneth Kim
(74) *Attorney, Agent, or Firm* — Nixon & Vanderhye P.C.

(57) ABSTRACT

A data processing apparatus executes instructions in a sequence of pipelined execution stages. An error detection unit twice samples a signal associated with execution of an instruction and generates an error signal if the samples differ. An exception storage unit maintains an age-ordered list of entries corresponding to instructions issued to the execution pipeline and can mark an entry to show if the error signal has been generated in association with that instruction. A timer unit is responsive to generation of the error signal to initiate timing of a predetermined time period. An error recovery unit initiates a soft pipeline flush procedure if an oldest pending entry in the list has said error marker stored in association therewith and initiates a hard pipeline flush procedure if said predetermined time period elapses, said hard flush procedure comprising resetting said pipeline to a predetermined state.

20 Claims, 6 Drawing Sheets

(56) References Cited

OTHER PUBLICATIONS

Blaauw et al., "Razor II: In Situ Error Detection and Correction for PVT and SER Tolerance", *ISSCC 2008*, Session 22, 22.1, 2008, pp. 400-401 & 622.

Bowman et al., "Energy-Efficient and Mestability-Immune Timing-Error Detection and Instruction-Replay Based Recovery Circuits for Dynamic-Variation Tolerance", *ISSCC 2008*, Session 22, 22.2, 2008, pp. 402-403 & 623.

Nicoladis et al., "A Generalized Theory of Fail-Safe Systems", *IEEE*, 1998, pp. 398-406.

Floros et al., "A Pipeline Architecture Incorporating Low-Cost Error Detection and Correction Mechanism", *IEEE*, 2006, pp. 692-695.

Bull et al., Corrections to "A Power-Efficient 32 bit ARM Processor Using Timing-Error Detection and Correction for Transient-Error Tolerance and Adaptation to PVT Variation", *IEEE Journal of Solid-State Circuits*, vol. 46, No. 3, Mar. 2011, p. 705.

Lubaszewski et al., "A Reliable Fail-Safe System", *IEEE Transactions on Computers*, vol. 47, No. 2, Feb. 1998, pp. 236-241.

Meixner et al., "Argus: Low-Cost, Comprehensive Error Detection in Simple Cores", $40^{th}$ *IEEE/ACM Int'l. Symposium on Microarchitecture*, 2007, pp. 210-222.

Das et al., "A Self-Tuning DVS Processor Using Delay-Error Detection and Correction", *IEEE Journal of Solid-State Circuits*, vol. 41, No. 4, Apr. 2006, pp. 792-804.

Das et al., "A Self-Tuning DVS Processor Using Delay-Error Detection and Correction", *2005 Symposium on VLSI*, 17.1, 2005, pp. 258-261.

Agarwal et al., "Circuit Failure Prediction and its Application to Transistor Aging", $25^{th}$ *IEEE VLSI Test Symposium*, 2007, 8 pages.

Anghel et al., "Cost Reduction and Evaluation of a Temporary Faults Detecting Technique", No Date, 8 pages.

Nomura et al., "Delay and Power Monitoring Schemes for Minimizing Power Consumption by Means of Supply and Threshold Voltage Control in Active and Standby Modes", *IEEE Journal of Solid-State Circuits*, vol. 41, No. 4, Apr. 2006, pp. 805-814.

Raahemifar et al., "Design-for-Testability Techniques for Detecting Delay Faults in CMOS/BiCMOS Logic Families", *IEEE Transactions on Circuits and Systems*, vol. 47, No. 11, Nov. 2000, pp. 1279-1290.

M. Nicoladis, "Efficient Implementations of Self-Checking Adders and Alus", *IEEE*, 1993, pp. 586-595.

Nicoladis et al., "Efficient Implementations of Self-Checking Multiply and Divide Arrays", *IEEE*, 1994, pp. 574-579.

Nicoladis et al., "Fault-Secure Parity Prediction Arithmetic Operators", *IEEE Design & Test of Computers*, 1997, pp. 60-71.

Austin et al., "Making Typical Silicon Matter with Razor", *IEEE Computer Society*, Mar. 2004, pp. 57-65.

Yeager et al., "Microprocessor Power Optimization through Multi-Performance Device Insertion", *2004 Symposium on VLSI Circuits*, 20.5, 2004, pp. 334-337.

Franco et al., "On-Line Delay Testing of Digital Circuits", *IEEE*, 1994, pp. 167-173.

Kurimoto et al., "Phase-Adjustable Error Detection Flip-Flops with 2-Stage Hold Driven Optimization and Slack Based Grouping Scheme for Dynamic Voltage Scaling", *DAC2008*, 47.3, pp. 884-889.

Ernst et al., "Razor: A Low-Power Pipeline Based on Circuit-Level Timing Speculation", $36^{th}$ *Int'l. Symposium on Microarchitecture*, 2003, 12 pages.

Dutt et al., "REMOD: A New Methodology for Designing Fault-Tolerant Arithmetic Circuits", *IEEE Transactions on VLSI*, vol. 5, No. 1, Mar. 1997, pp. 34-56.

Bowman et al., "Resilient Microprocessor Design for Improving Performance and Energy Efficient", *IEEE*, 2010, pp. 85-88.

Mitra et al., "Robust System Design with Built-In Soft-Error Resilience", *IEEE Computer Society*, Feb. 2005, pp. 43-52.

Metra et al., "Self-Checking Detection and Diagnosis of Transient, Delay, and Crosstalk Faults Affecting Bus Lines", *IEEE Transactions on Computers*, vol. 49, No. 6, Jun. 2000, pp. 560-574.

Calhoun et al., "Standby Power Reduction Using Dynamic Voltage Scaling and Canary Flip-Flop Structures", *IEEE Journal of Solid-State Circuits*, vol. 39, No. 9, Sep. 2004, pp. 1504-1511.

M. Nicoladis, "Strongly Fail-Safe Interfaces Based on Concurrent Checking", *IEEE*, 1994, pp. 45-50.

H. Veendrick, "The Behavior of Flip-Flops Used as Synchronizers and Prediction of Their Failure Rate", *IEEE Journal of Solid-State Circuits*, vol. SC-15, No. 2, Apr. 1980, pp. 169-176.

M. Nicoladis, "Time Redundancy Based Soft-Error Tolerance to Rescue Nanometer Technologies", *TIMA*, No Date, 9 pages.

Karimi et al., "Workload-Cognizant Concurrent Error Detection in the Scheduler of a Modern Microprocessor", *IEEE Transactions on Computers*, vol. 60, No. 9, Sep. 2011, pp. 1274-1287.

Tsiatouhas et al., "A Sense Amplifier Based Circuit for Concurrent Detection of Soft and Timing Errors in CMOS ICs", $9^{th}$ *IEEE Int'l. Online Testing Symposium*, 2003, 5 pages.

Moudgil et al., "Register renaming and dynamic speculation: an alternative approach", Sep. 1993, pp. 1-13.

Copeland et al., "The GNU Privacy Handbook", *The Free Software Foundation*, 1999, 41 pages.

\* cited by examiner

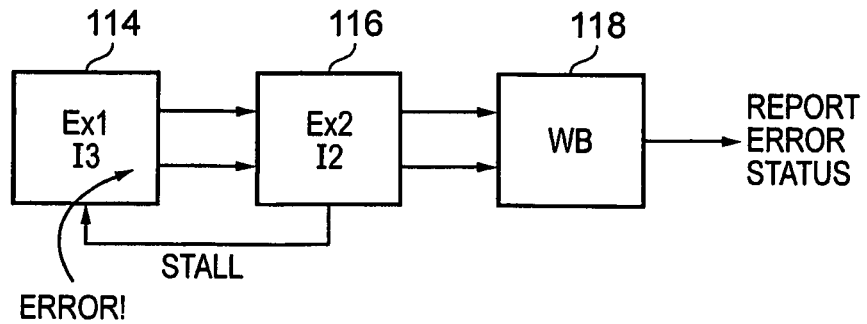
FIG. 3A
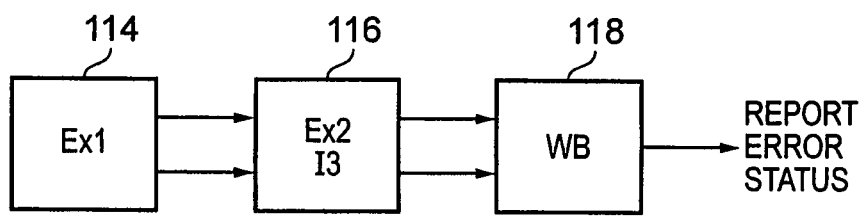
FIG. 3B
| ExFIFO | ERROR | VALID |
|---|---|---|
| I0 | 0 | 1 |
| I1 | 0 | 1 |
| I2 | | |
| I3 | | |
FIG. 3C
| ExFIFO | ERROR | VALID |
|---|---|---|
| I2 | | |
| I3 | 1 | 1 |
| | | |
| | | |
FIG. 3D

ERROR RECOVERY UPON REACHING OLDEST INSTRUCTION MARKED WITH ERROR OR UPON TIMED EXPIRATION BY FLUSHING INSTRUCTIONS IN PIPELINE PENDING QUEUE AND RESTARTING EXECUTION

BACKGROUND OF THE INVENTION

1. Field of the Invention

The present invention relates to data processing apparatuses configured to execute instructions in an execution pipeline. More particularly, the present invention relates to data processing apparatuses having an error recovery unit configured to initiate a recovery process when an error is detected as having occurred during execution of an instruction in the execution pipeline.

2. Description of the Prior Art

It is known to provide a data processing apparatus which has an execution pipeline in which instructions provided to the data processing apparatus are executed in a sequence of pipelined execution stages. It is further known to provide an exception storage unit in association with such an execution pipeline, the exception storage unit being arranged to maintain a list corresponding to the instructions being executed in the execution pipeline such that a recovery procedure can be initiated if it is established that there has been a problem associated with the execution of a particular instruction. For example, in a data processing apparatus configured to speculatively execute instructions on the basis of a branch prediction, if that branch prediction turns out to have been incorrect, it is necessary to "rewind" the instruction execution to the point at which the branch was mis-predicted. Another example is the case of an instruction which initiates a load operation which seeks to retrieve data stored in an external device, wherein that load operation may abort, requiring the associated instruction to be reissued to the execution pipeline. An exception storage unit enables such replaying of instructions to take place by maintaining a set of status information associated with each instruction currently being executed until each instruction is confirmed by the execution pipeline to have successfully completed.

It is further known to provide a data processing apparatus with at least one error detection unit which is configured to take two samples of a given signal propagating in the data processing apparatus, the second sample being taken after a short delay period with respect to the first sample, and to generate an error signal if the two samples differ. Such an error detection unit is for example of benefit in a data processing apparatus in which it may be attempted to operate the data processing apparatus at, or at least close to, its limits of reliable operation, for example in terms of clock speed, operating voltage, or even process reliability. An error signal generated by the error detection unit can indicate that the data processing apparatus has entered a regime in which the first sample of the signal has become unreliable (as determined with reference to the second sample), for example because a changing signal has been sampled slightly too early and therefore in a wrong state.

In a data processing apparatus which has an error detection unit it is further known to provide an error recovery unit which seeks to initiate an error recovery procedure which is carried out to seek to remedy adverse consequences resulting from that error. For example, in conjunction with an exception storage unit in the data processing apparatus, if the error detected is associated with a particular instruction, that instruction and any that follow it in the exception storage unit may be replayed in order to ensure that correct data processing operations in response to the data processing instructions are carried out.

However, depending on the nature of the signal of which a detected error is associated, prior art techniques for identifying the occurrence of that error and seeking to remedy it can prove to be fallible, in that situations can arise in which the data processing apparatus cannot successfully recover when some errors occur. Accordingly, it would be desirable to provide an improved technique for recovery which enables the data processing apparatus to successfully resume correct operation, regardless of where the error occurs in the data processing apparatus.

SUMMARY OF THE INVENTION

Viewed from a first aspect, the present invention provides a data processing apparatus comprising: an execution pipeline configured to execute instructions in a sequence of pipelined execution stages; an error detection unit configured to generate a first sample of a signal associated with execution of an instruction in said execution pipeline, configured to generate a second sample of said signal after a delay period, and configured to generate an error signal associated with said instruction if said first sample and said second sample differ; an exception storage unit configured to maintain an age-ordered list of entries corresponding to instructions issued to said execution pipeline for execution, each entry initially defined as pending, said exception storage unit configured to store in association with each entry an error marker if said error signal has been generated in association with the instruction corresponding to that entry, said exception storage unit configured to mark an entry as non-pending when said execution pipeline indicates that an instruction associated with said entry has completed execution without said error signal being generated in association therewith, and said exception storage unit configured to sequentially retire oldest non-pending entries from said list; a timer unit configured to be responsive to generation of said error signal to initiate timing of a predetermined time period; an error recovery unit configured to cause a soft flush procedure to be carried out if an oldest pending entry in said list has said error marker stored in association therewith, said soft flush procedure comprising removing all pending entries from said list, cancelling execution in said pipelined execution stages of instructions corresponding to said pending entries, cancelling said timing of said predetermined time period and restarting execution of said instructions at an instruction corresponding to said oldest pending entry; and said error recovery unit configured to cause a hard flush procedure to be carried out if said predetermined time period elapses, said hard flush procedure comprising removing all entries from said list, resetting said pipeline to a predetermined state and restarting execution of said instructions at an instruction corresponding to an oldest entry in said list.

A data processing apparatus is provided which has an execution pipeline in which instructions being executed by the data processing apparatus are passed through a sequence of pipelined execution stages. An exception storage unit maintains an age-ordered list of entries corresponding to the instructions currently being executed in the execution pipeline and sequentially retires entries from this list that correspond to instructions which have successfully completed execution. The data processing apparatus also has an error detection unit which generates a first sample of a signal associated with execution of an instruction in the execution pipeline and a second sample of the same signal after a delay period and generates an error signal if the first sample and second sample differ. The provision of such an error detection unit enables the data processing apparatus to be operated in a regime which would otherwise be deemed too unreliable because of the chance of errors occurring. For example, this regime could comprise operating the data processing apparatus at a high clock speed or at a low operating voltage, or could even relate to the physical construction of the data processing apparatus in which the data processing apparatus is fabricated according to constructional parameters which mean that the operation of the data processing apparatus is not guaranteed to be reliable. The error detection unit samples a signal at two moments which should (if the data processing apparatus is operating correctly) result in the two samples being the same. However, if the data processing apparatus is operating at the limit of its reliability, the two samples may differ. It is the first sample which is used as part of the data processing carried out in the data processing apparatus and accordingly if the second sample differs from this first sample the data processing operations reliant on the sampled signal will not be proceeding as planned. Accordingly, if the error detection unit generates an error signal in association with execution of an instruction, the entry in the exception storage unit corresponding to that instruction is marked to indicate that the execution of that instruction cannot be relied upon. An error recovery unit monitors the content of the exception storage unit and if an oldest entry in the list has not been marked as successfully completing also has an error marker stored in association therewith, the error recovery unit causes a soft flush procedure to be carried out. This soft flush procedure removes all pending entries from the list (corresponding to those instructions younger than the instruction marked as having been associated with the generation of an error), cancels execution in the pipelined execution stages of those younger entries and restarts execution of the sequence of instructions being carried out by the data processing apparatus at the instruction which caused the error.

The present invention further recognises that situations may arise in which an entry in the exception storage unit associated with an instruction, the execution of which has caused an error signal to be generated by the error detection unit, will never proceed to become the oldest pending (i.e. not (yet) successfully completed) entry in the list and hence the soft flush procedure will never be initiated by the error recovery unit. For example, such a situation may arise when the nature of the error which has arisen is such that an instruction which has an older entry in the exception storage unit remains pending without the error marker being stored in association therewith, thus blocking the error recovery unit from proceeding with a soft flush procedure to resolve the problems associated with the instruction which generated the error.

This deadlock problem is resolved by the provision of a timer unit which, in response to the generation of the error signal, starts timing a predetermined time period (i.e. a countdown begins). An additional aspect of the soft flush procedure is to cancel this timing being carried out by the timer unit. However, if the predetermined time period elapses (i.e. the countdown reaches 0) then the error recovery unit is configured to cause a hard flush procedure to be carried out. The predetermined time period is set such that if this time period elapses after the error signal has been generated without a soft flush procedure having been carried out, it can be assumed that either the processor has deadlocked or that at least forward progress of data processing has been delayed for such a long period that a reset is worthwhile. The hard flush procedure removes all entries from the list held by the exception storage unit, resets the pipeline to a predetermined state (i.e. cancels execution of any instructions currently being executed by the pipeline and resets all configurational parameters of the pipeline to a known state) and restarts execution of the sequence of instructions being executed by the data processing apparatus from the instruction which corresponds to the oldest entry in the list (i.e. the oldest entry before all entries were removed).

Accordingly, the data processing apparatus is able to recover from the occurrence of an error, the very nature of which has disrupted the usual error recovery mechanisms provided to such an extent that those error recovery mechanisms will not be able to function. Advantageously, this means that the data processing apparatus can be arranged such that it can be allowed to operate in regimes in which the possibility of an error occurring in a given signal can lead to errors in signals which would previously have resulted in deadlocks from which the error recovery mechanism could not rescue it.

In some embodiments the data processing apparatus comprises a plurality of error detection units. Indeed, typically many such error detection units will be provided throughout the data processing apparatus, in particular throughout the execution pipeline, in order to be able to identify errors associated with the timing of the sampling of a signal to be detected wherever they occur.

In some embodiments said plurality of error detection units are coupled together to generate a final error signal which indicates that said error signal has been generated in at least one of said plurality of error detection units. Generally speaking, the fact that an error has occurred at all is of more significance than where it has occurred since the occurrence of the error means that the associated instruction will need to be replayed through the whole execution pipeline and accordingly it is beneficial to generate a final error signal which indicates that the error signal has been generated in at least one of the plurality of error detection units.

In particular, in one embodiment said plurality of error detection units are arranged in said sequence of pipelined execution stages respectively. Hence, the final error signal indicates whether an error has been detected in any of the pipeline execution stages. In some embodiments, said error signal is comprised in an error status item and said execution pipeline is configured to propagate said error status item through said sequence of pipelined execution stages in association with said instruction. Encapsulating the error signal (or the absence thereof) in an error status item which propagates through the execution pipeline in association with an instruction provides a reliable mechanism for tracking the association between error signals and instructions. In particular when an instruction completes execution through the entire pipeline, examination of the associated error status item which accompanies it enables the determination of whether that instruction was executed in all the pipelined execution stages without an error occurring.

Furthermore, this can provide a reliable mechanism for updating the age-ordered list of entries in the exception storage unit and in one embodiment said error marker is stored in dependence on said final error signal comprised in said error status item at a conclusion of said execution pipeline.

There are a number of ways in which the timer unit can be arranged to be responsive to the generation of the error signal to initiate timing of the predetermined time period. In one embodiment said timer unit is configured to be responsive to presence of said final error signal at said conclusion of said execution pipeline to initiate timing of said predetermined time period. Hence, a direct link can be provided between the presence of the final error signal at the end of the execution pipeline and starting the "watchdog" timer. Alternatively, the initiation of the timer may be linked to the status of the list of entries and in one embodiment said timer unit is configured to be responsive to storage of said error marker to initiate timing of said predetermined time period.

However, in some embodiments the timer unit may be more directly linked to the error detection units in the data processing apparatus and in such embodiments said timer unit is configured to be responsive to generation of said error signal from any of said plurality of error detection units to initiate timing of said predetermined time period. Not only does this provide a more direct connection between the generation of an error signal in one of the error detection units and the timer unit, but in particular this may provide a more reliable initiation of the timing of the predetermined time period, for example in cases where the signal, the sampling of which has resulted in the generation of the error signal, is itself involved in such a way with the propagation of the error signal through the execution pipeline that the error signal may not correctly propagate and would otherwise simple be lost. By connecting the timer unit in this more direct fashion to the error detection units, this kind of failure of the error recovery mechanism can also be coped with.

In one embodiment, said exception storage unit is configured to sequentially retire said oldest non-pending entries from said list on a per-processing cycle basis.

The selection of the predetermined time period for the timer unit will depend on the requirements of the particular data processing apparatus in which this timer unit is found. For example, in one embodiment said data processing apparatus is a real-time data processing apparatus and said predetermined time period is preset in dependence on a clock cycle length of said execution pipeline. In such a real-time data processing apparatus in which the opportunities for delay in execution of instructions are by definition very limited, the predetermined time period can essentially correspond to the clock cycle length of the execution pipeline since this represents the maximum possible period between the occurrence of an error (in the very first part of the execution pipeline) and that instruction exiting the execution pipeline.

However, in other embodiments the maximum delay that may be associated with execution of instruction (during normal error free operation) may be considerably longer, for example where execution of instructions can initiate access to a peripheral device and in such an embodiment where execution of said instructions comprises access to a peripheral device of said data processing apparatus, said predetermined time period is preset in dependence on a maximum latency of said peripheral device. Hence, once a time difference has expired which can no longer be accounted for in terms of the execution pipeline and the latency of the peripheral device, it can be assumed that an error has occurred.

The predetermined time period measured by the timer unit in some embodiments is hardwired (for example when the maximum expected delay for instructions is dependent on the hardware configuration of the data processing apparatus), whilst in other embodiments the predetermined time period is settable by software (for example when the maximum delay associated with the execution of instruction can depend upon the nature of the instructions provided to the data processing apparatus).

In some embodiments said error detection unit is arranged in control logic associated with said execution pipeline and said signal is a control signal arranged to control operation of said execution pipeline. As mentioned above, the present invention recognises that errors associated with some signals in a data processing apparatus would be particularly damaging to its ability to recover from the occurrence of those errors. Errors occurring in control signals which control operation of the execution pipeline represent a good example of this since when such a control signal is misinterpreted, the operation of the execution pipeline becomes unpredictable.

There are many such controls signals which control operation of the execution pipeline, but in one embodiment said error detection unit is arranged in interlock logic associated with said sequence of pipelined execution stages and said signal is an interlock signal passed between said pipelined execution stages. An interlock signal which is passed between pipeline execution stages is an example of a control signal which is crucial to the correct operation of the execution pipeline, since if an instruction stalls in one pipelined execution stage, it is necessary for that execution stage to reliably pass this stall signal to the pipeline execution stages upstream of it. If such an interlock signal fails, the pipeline execution stages upstream of the pipeline execution stage will not similarly stall their own execution and a pathological situation follows in which the content of a pipeline stage which is merely stalled are wrongly overwritten by the following instructions. In one embodiment said signal is a validity signal passed between said pipelined execution stages, said validity signal arranged to indicate to a subsequent pipelined execution stage that signals arriving from a previous pipelined execution stage should be processed. In this example, the validity signal is equally important since this signal is used to inform a subsequent pipelined execution stage that signals arriving from a previous pipelined execution stage should be processed. If this signal fails then an instruction which should be passed through the sequence of pipelined execution stages will be dropped at the point in which the validity signal fails.

In one embodiment, said error detection unit is arranged in an issue stage of said sequence of pipelined execution stages and said signal is an instruction selection signal arranged to indicate a next instruction to be passed through said pipelined execution stages. Here, if the instruction selection signal is misinterpreted, the queued instructions will not be correctly allocated to the pipeline execution stages and unpredictable consequences follow.

Viewed from a second aspect the present invention provides a data processing apparatus comprising execution pipeline means for executing instructions in a sequence of pipelined execution stages; error detection means for generating a first sample of a signal associated with execution of an instruction in said execution pipeline means, for generating a second sample of said signal after a delay period, and for generating an error signal associated with said instruction if said first sample and said second sample differ; exception storage means for maintaining an age-ordered list of entries corresponding to instructions issued to said execution pipeline for execution, each entry initially defined as pending, said exception storage means for storing in association with each entry an error marker if said error signal has been generated in association with the instruction corresponding to that entry, said exception storage means for marking an entry as non-pending when said execution pipeline means indicates that an instruction associated with said entry has completed execution without said error signal being generated in association therewith, and said exception storage means for sequentially retiring oldest non-pending entries from said list; timer means for initiating timing of a predetermined time period in response to generation of said error signal; error recovery means for causing a soft flush procedure to be carried out if an oldest pending entry in said list has said error marker stored in association therewith, said soft flush procedure comprising removing all pending entries from said list, cancelling execution in said pipelined execution stages of instructions corresponding to said pending entries, cancelling said timing of said predetermined time period and restarting execution of said instructions at an instruction corresponding to said oldest pending entry; and said error recovery means for causing a hard flush procedure to be carried out if said predetermined time period elapses, said hard flush procedure comprising removing all entries from said list, resetting said pipeline means to a predetermined state and restarting execution of said instructions at an instruction corresponding to an oldest entry in said list.

Viewed from a third aspect the present invention provides a method of data processing comprising: executing instructions in a sequence of pipelined execution stages of an execution pipeline; generating a first sample of a signal associated with execution of an instruction in said execution pipeline, generating a second sample of said signal after a delay period, and generating an error signal associated with said instruction if said first sample and said second sample differ; maintaining in an exception storage unit an age-ordered list of entries, corresponding to instructions issued to said execution pipeline for execution, each entry initially defined as pending, storing in association with each entry an error marker if said error signal has been generated in association with the instruction corresponding to that entry, marking an entry as non-pending when said execution pipeline indicates that an instruction associated with said entry has completed execution without said error signal being generated in association therewith, and sequentially retiring oldest non-pending entries from said list; initiating timing of a predetermined time period in response to generation of said error signal; carrying out a soft flush procedure if an oldest pending entry in said list has said error marker stored in association therewith, said soft flush procedure comprising removing all pending entries from said list, cancelling execution in said pipelined execution stages of instructions corresponding to said pending entries, cancelling said timing of said predetermined time period and restarting execution of said instructions at an instruction corresponding to said oldest pending entry; and carrying out a hard flush procedure if said predetermined time period elapses, said hard flush procedure comprising removing all entries from said list, resetting said pipeline to a predetermined state and restarting execution of said instructions at an instruction corresponding to an oldest entry in said list.

BRIEF DESCRIPTION OF THE DRAWINGS

The present invention will be described further, by way of example only, with reference to embodiments thereof as illustrated in the accompanying drawings, in which:

FIGS. 3A and 3B schematically illustrate how an error can allow a following instruction to overwrite a stalled instruction in one embodiment;

FIGS. 3C and 3D illustrate how the entries of an exception storage unit can result in a deadlock situation when the overwriting described with reference to FIGS. 3A and 3B occurs in one embodiment;

DESCRIPTION OF THE PREFERRED EMBODIMENTS

Figure 1A:
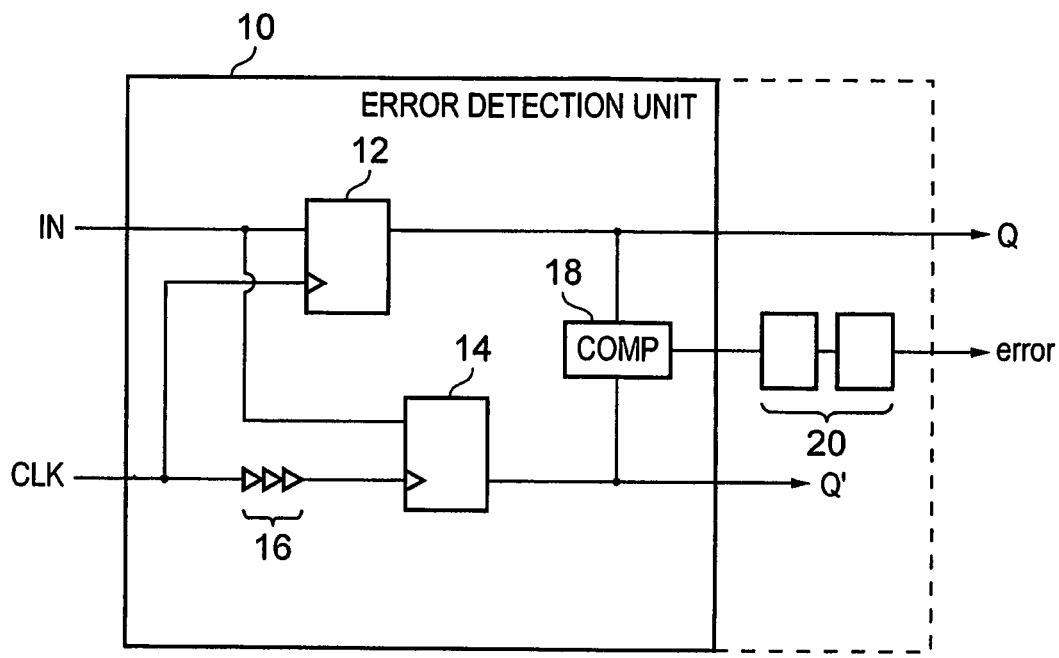
FIG. 1A schematically illustrates an error detection unit in one embodiment.

FIG. 1A schematically illustrates an error detection unit in one embodiment. The error detection unit 10 is arranged to receive two inputs "IN" and "CLK". The IN input provides a signal for which the error detection unit 10 is arranged to detect an error and CLK provides a clock signal which determines when the signal provided at the IN input should be sampled. A first sampling of the IN signal is carried out by digital flip flop (DFF) 12 in dependence on the clock signal (CLK). A second sampling of the signal IN is carried out by DFF 14 in dependence on a delayed version of the CLK clock signal, this delay being provided by a delay unit 16, which in this example is provided by a sequence of buffers. The delay provided by the delay unit 16 is arranged such that when the signal IN is reliable, both the first sample of the signal taken by DFF 12 and the second sample of the signal taken by DFF 14 should result in the same value. For example, DFF 12 is arranged to sample the IN signal shortly after a rising clock edge of the CLK signal, whilst the DFF 14 is arranged to sample the IN signal shortly after a rising edge of the delayed version of the CLK signal, but still within a time frame such that both samples should be the same, i.e. within the same clock cycle. The comparison of the two samples is carried out by comparator 18, wherein if the two samples (Q and Q') differ then an error signal is generated. Because, the possibility exists that the undelayed sampling (by DFF 12) took place so early in the clock cycle that DFF 12 was not stably configured when the sample was taken, some meta-stability of the output signal of comparator 18 can result. Accordingly, the output of the comparator is passed through two further flops 20 to clean this meta-stability. These two further flops 20 can also be considered to form part of the error detection unit 10.

The error detection unit 10 may be introduced at any point within a data processing apparatus at which the reliability of a signal should be checked. Accordingly, the signal IN in FIG. 1A could either be a data signal or a control signal, and the present techniques can be applied to either situation. However, as will be described in more detail in the following, the present techniques are of particular benefit when applied in the context of a control signal, due to the fact that such an error can more easily result in a pathological status of the data processing apparatus from which it may struggle to recover.

Figure 1B:
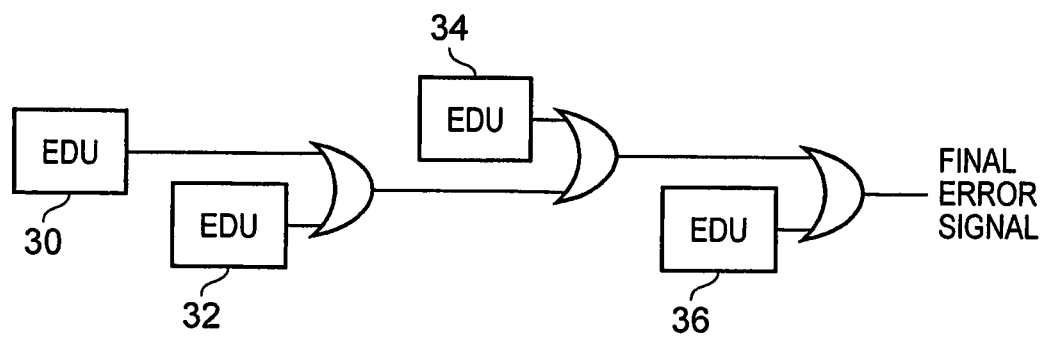
FIG. 1B schematically illustrates the concatenation of a plurality of error detection units to generate a final error signal in one embodiment.

When an error detection unit is used to monitor the reliability of a signal in a data processing apparatus, there will in fact typically be many such error detection units provided in the data processing apparatus. The present invention is particularly concerned with error signals generated by error detection units which monitor the reliability of signals associated with the execution of instructions in an execution pipeline of a data processing apparatus. Due to the fact that an instruction must pass through the entire execution pipeline without errors occurring if its results are to be relied upon, it is useful to generate a signal which is indicative of whether an error has occurred anywhere along the path followed by the instruction. Accordingly, error detection units may be coupled together as schematically illustrated in FIG. 1B in order to generate a final error signal which indicates if any of the error detection units 30, 32, 34, 36 have generated an error signal. Accordingly, FIG. 1B can represent part of an execution pipeline with a single error detection unit in each of its four pipelined stages, wherein the final error signal indicates at the conclusion of the pipeline if any of those error detection units associated with each pipeline stage has generated an error signal. Alternatively, in view of the fact that a typical implementation may provide many error detection units within one pipeline stage, FIG. 1B can be considered to represent a set of four error detection units within one pipeline stage wherein the final error signal indicates whether any of the error detection units within that particular pipeline stage has generated an error signal.

Figure 2:
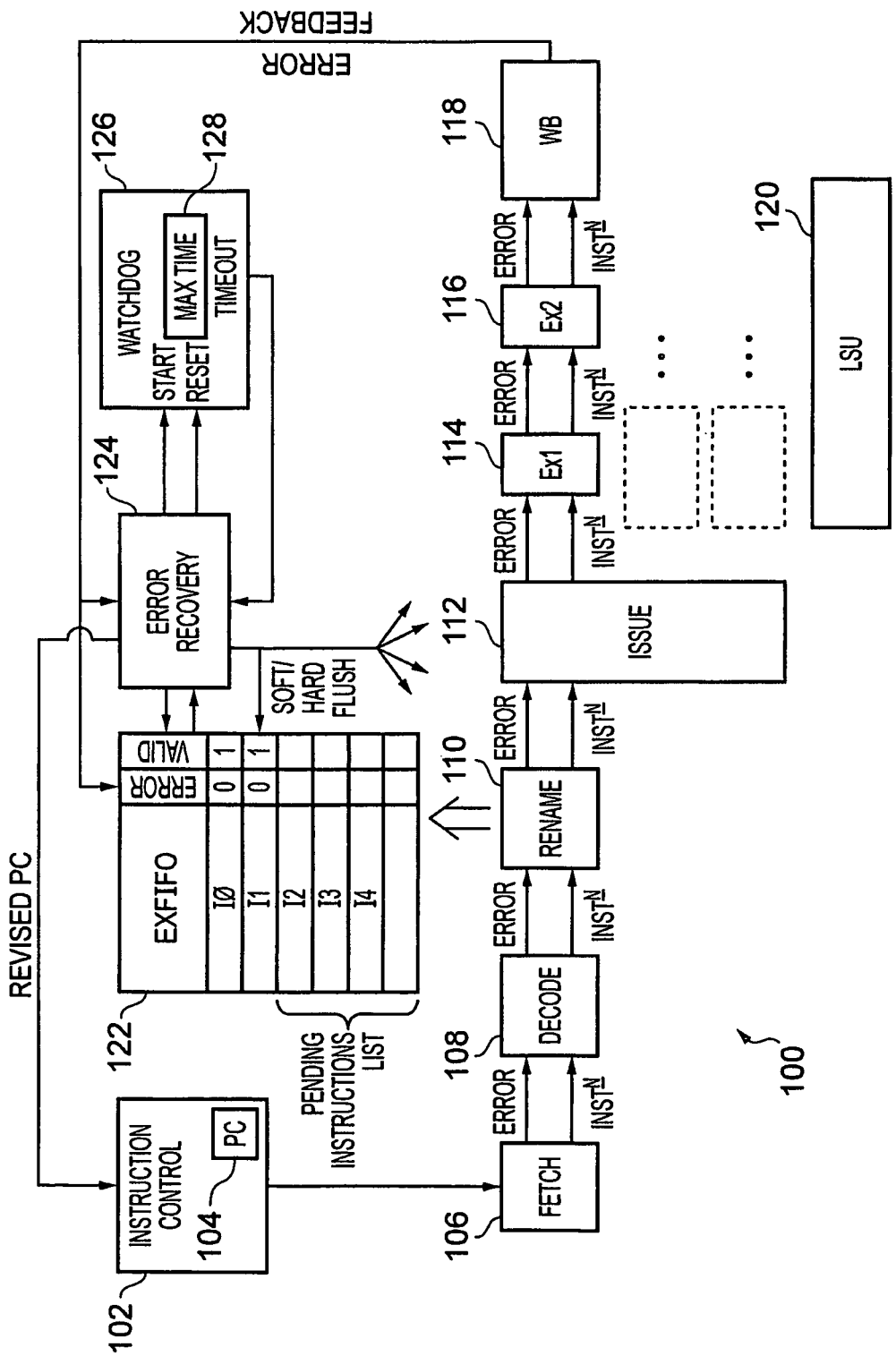
FIG. 2 schematically illustrates a data processing apparatus in one embodiment.

FIG. 2 schematically illustrates a data processing apparatus in one embodiment. The data processing apparatus 100 comprises an execution pipeline which is configured to execute a sequence of instructions provided to the data processing apparatus. It will be recognised that the execution pipeline is not illustrated in full detail here, but for clarity of discussion is only represented schematically to allow the discussion to focus on the salient points relevant to the present invention. The general flow of instruction execution illustrated begins with instruction control 102 which, in dependence on the program counter (PC) 104 controls the fetch unit 106 to retrieve the next instruction which should be executed by the data processing apparatus from memory. From fetch unit 106, the instruction is passed to decode unit 108, to renaming unit 110 and from there to issue unit 112. The issue unit 112 allocates instructions for execution to the first execution stage (EX1) 114, but can typically also issue instructions to further execution stages as illustrated by the dashed boxes, which are not fully illustrated here to avoid overfilling the figure. The execution stages of the execution pipeline (or pipelines) can also make use of load store unit (LSU) 120 to transfer data to and from external memory. Accordingly, in the illustrated pipeline an instruction is passed from execution stage (EX1) 114 to execution stage (EX2) 116 and from there to the final write back (WB) stage 118. Notice in particular that as illustrated, not only is an instruction passed along the execution pipeline, but it is also accompanied by error information which propagates in parallel with its associated instruction. This error information (also referred to herein as an error status item) enables a determination to be made at the conclusion of the executed pipeline as to whether an error signal was generated in association with the execution of a given instruction as it passed through the execution pipeline. Accordingly, it should be understood that in the illustrated embodiment in FIG. 2, error detection units such as that schematically illustrated in FIG. 1A are provided throughout the execution pipeline and the error status item which is passed from pipelined execution stage is updated to indicate that an error has been generated in association with the relevant instruction if any of the error detection units provided in the preceding pipelined execution stage (for example coupled together as shown in FIG. 1B) have generated an error signal in association with the execution of that instruction. Note that the error status item has an associated ID in order to be able to associate it with a particular instruction.

Tracking the success of instructions which propagate through the instruction pipeline is enabled by the age-ordered list of entries maintained by the exception storage unit (exception FIFO) 122. An entry is made in EXFIFO 122 for each instruction which enters the execution pipeline. The completion of an instruction through the execution pipeline causes the corresponding entry in the EXFIFO 122 to be updated, to indicate that the instruction has completed through the execution pipeline (indicated by the "valid" bit being set) and its error status is recorded by the "error" bit (1 or 0) being set. Instructions which successfully complete through the execution pipeline without an error being generated in association therewith (i.e. those marked as error number 0 and valid number 1) are then sequentially retired from the EXFIFO 122 in age order (oldest first). The data processing apparatus 100 is configured to retire one non-error-marked completed instruction per processing cycle from EXFIFO 122.

An error recovery unit 124 monitors the status of entries in the EXFIFO 122. The error feedback from the conclusion of the execution pipeline is also notified to error recovery unit 124 so that it can start watchdog timer 126 if an error signal is asserted.

The error recovery unit 124 is configured to monitor the oldest pending entry in the EXFIFO 122 (here, "non-pending" is defined as being those instructions which have completed without error, i.e. error=0/valid=1) and all other states i.e. no error/valid information yet or error=1/valid=1 counts as "pending"). If the oldest pending entry in the EXFIFO has the error marker set then the error recovery unit 124 initiates a soft flush procedure. This soft flush procedure removes that entry and all younger entries from the EXFIFO and signals to the pipeline that a soft flush procedure should be carried out. This soft flush procedure may be signalled to the pipeline stages either with reference to a particular time stamp or instruction number and each stage is configured to cancel execution of any instructions corresponding to or younger than this time stamp or instruction number. The error recovery unit then causes execution of instructions to restart from the instruction corresponding to the oldest pending entry (before the EXFIFO was flushed) which had the error marker by causing instruction control unit 102 to reset the program counter PC 104 accordingly and to cause fetch unit 106 to roll back to this instruction. Additionally the soft flush procedure causes the watchdog timer 126 to be stopped and reset. Accordingly, it can be seen that the soft flush procedure provides the error recovery unit 124 with a mechanism for coping with an error signal being generated in association with one of the instructions passing through the execution pipeline and to replay instructions as necessary to allow an error free execution of that instruction and those that follow it to occur.

However, the present invention also recognises that the nature of some errors which may take place in the execution pipeline may be such that the soft flush procedure will never be initiated and accordingly the data processing apparatus may find itself deadlocked. In such a situation when this deadlock occurs the watchdog timer 126 will eventually expire when the defined maximum time 128 of the timer expires. Depending on the type of data processing apparatus, this maximum time may either be a predetermined hard wired value or may be settable by software. In essence, the maximum time to wait is set such that once this time has elapsed, it can be sure that the execution pipeline is either deadlocked or is taking so long to process a particular instruction that a reset is worthwhile. When the watchdog timer 126 expires, this timeout is signalled to the error recovery unit 124 which responds by causing a hard flush procedure to be carried out. When this hard flush procedure is carried out all entries are flushed from the EXFIFO 122 and the execution pipeline is not only caused to cancel execution of any instructions currently therein but further to reset itself to a predetermined known state. This ensures that any misconfiguration that has resulted from the error occurring is corrected. Instruction execution is resumed from the instruction corresponding to the oldest entry (before the EXFIFO was flushed) in the EXFIFO 122.

FIGS. 3A and 3B schematically illustrate how a deadlock situation may arise in the execution pipeline and FIGS. 3C and 3D illustrate the corresponding entries in the EXFIFO 122. FIG. 3A schematically illustrates only three pipeline stages of the execution pipeline, namely EX1 114, EX2 116 and write back stage 118. At the instance illustrated in FIG. 3A, instruction I2 is currently being processed by EX2 pipeline stage 116 and instruction I3 is currently being processed by EX1 pipeline stage 114. I2 has stalled at EX2 (for example because it is waiting for the results of a memory access to return). This stalled status of pipeline stage 116 is signalled to the previous execution stage 114, which under normal, correct operation would also stall until pipeline stage 116 indicates that I2 has been released from this stage. However, an error occurs in a control signal within pipeline stage 114 and as a consequence I3 is not held at stage 114 but in the next processing cycle is passed to pipeline stage 116, overwriting instruction I2 that was being held there. An error signal is generated in association with I3 at stage 114 and the error status item carrying this error signal propagates through the execution pipeline with instruction I3 such that when I3 completes, the associated error in its execution is reported back to the EXFIFO 122.

The corresponding entries in the EXFIFO 122 are illustrated in FIGS. 3C and 3D. Note that FIGS. 3C and 3D do not show a full representation of EXFIFO 122 but only the entries of relevance to this discussion. Instructions I0 and I1, which preceded I2 and I3 through the execution pipeline have been marked in FIG. 3C as having successfully (error-free) completed the execution pipeline. Hence these entries in the EXFIFO will be sequentially retired in the following processing cycles. No status information has yet been reported for I2 and I3 at this stage illustrated in FIG. 3C. Turning to FIG. 3D, both I0 and I1 have been retired from the EXFIFO. However no status information has been entered for 3, since this instruction was overwritten by I2 (see FIG. 3D) and cannot complete. I3 has completed execution through the execution pipeline (the valid bit is set to 1) but it is known that an error occurred in association with the execution of this instruction (the error bit is set to 1). However, the error recovery unit 124 does not initiate a soft flush procedure to be carried out in association with I3, because the oldest pending entry is in the EXFIFO is I2. Essentially, error recovery unit 124 is waiting to see if instruction execution should be replayed as far back as I2, even though it is known that I3 will certainly have to be replayed. Without the watchdog timer and the hard flush procedure that it triggers, the data processing apparatus would deadlock in the situation represented by FIG. 3D. However, the watchdog timer has been triggered by the error status reported for I3 (for example error recovery unit 124 can trigger the watchdog 126 directly because it received the indication of an error itself or can trigger this in dependence on the error bit being set in association with the EXFIFO). When the watchdog timer expires, the error recovery unit 124 triggers the hard flush procedure and all entries of the EXFIFO are flushed, and the error recovery unit 124 signals to the execution pipeline that it should be reset to a known state and the error recovery unit instructs the instruction control unit 120 to replay the sequence of instructions beginning from I2.

Figure 4:
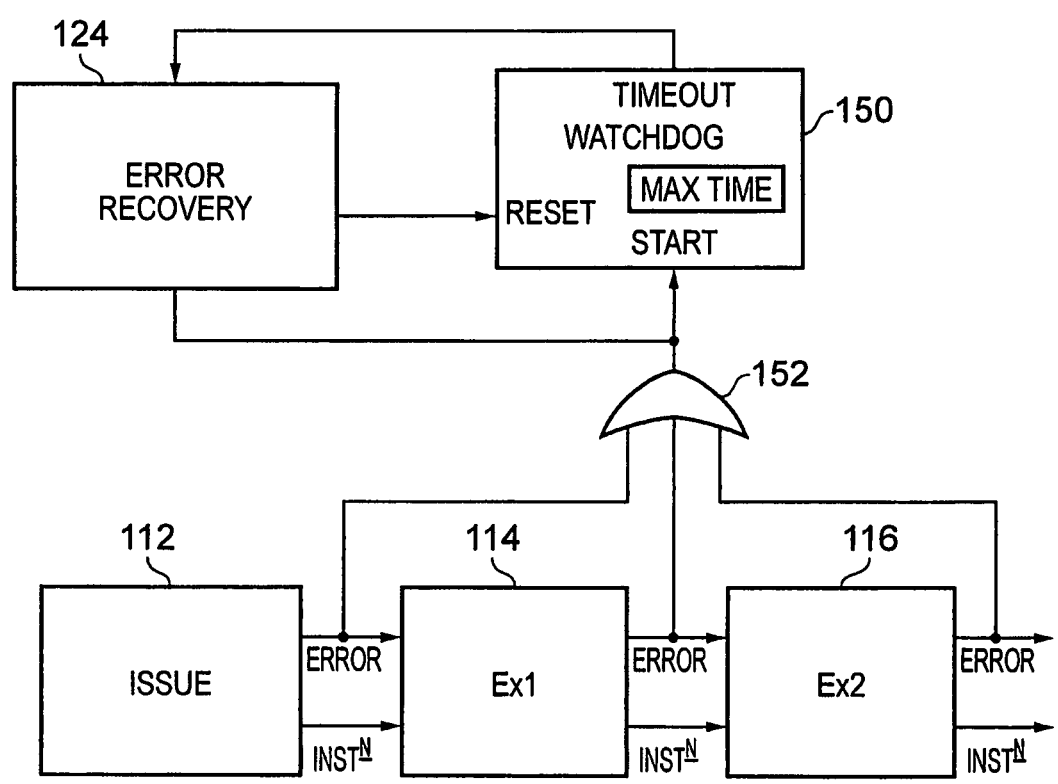
FIG. 4 schematically illustrates the timer unit being started in direct response to an error signal being generated anywhere along an execution pipeline in one embodiment.

FIG. 4 schematically illustrates an alternative configuration in which the watchdog timer 150 can be directly started by an error signal being generated anywhere within the data processing apparatus. A limited view of the execution pipeline is shown to illustrate this point. As shown in FIG. 4 an error signal being passed in the error item from any of issue unit 112, execution unit 114 or execution unit 116 is also passed to OR gate 152, the result of which is used to start the watchdog timer 150. In a further variant on FIG. 4, the error signal output from error detection units themselves (or at least concatenations thereof as represented in FIG. 1B), can be brought together to an OR gate 152 to start the watchdog timer 150. The advantage of this technique is that the initiation of the timing of the predetermined time period by the watchdog timer 150 is more reliably provided (at the expense of the additional wiring required to couple multiple error sources to the start of the watchdog timer) since it is possible for further errors in the system to disrupt the transmission of the error signal through the pipeline, in which case it might never be properly reported.

Figure 5A:
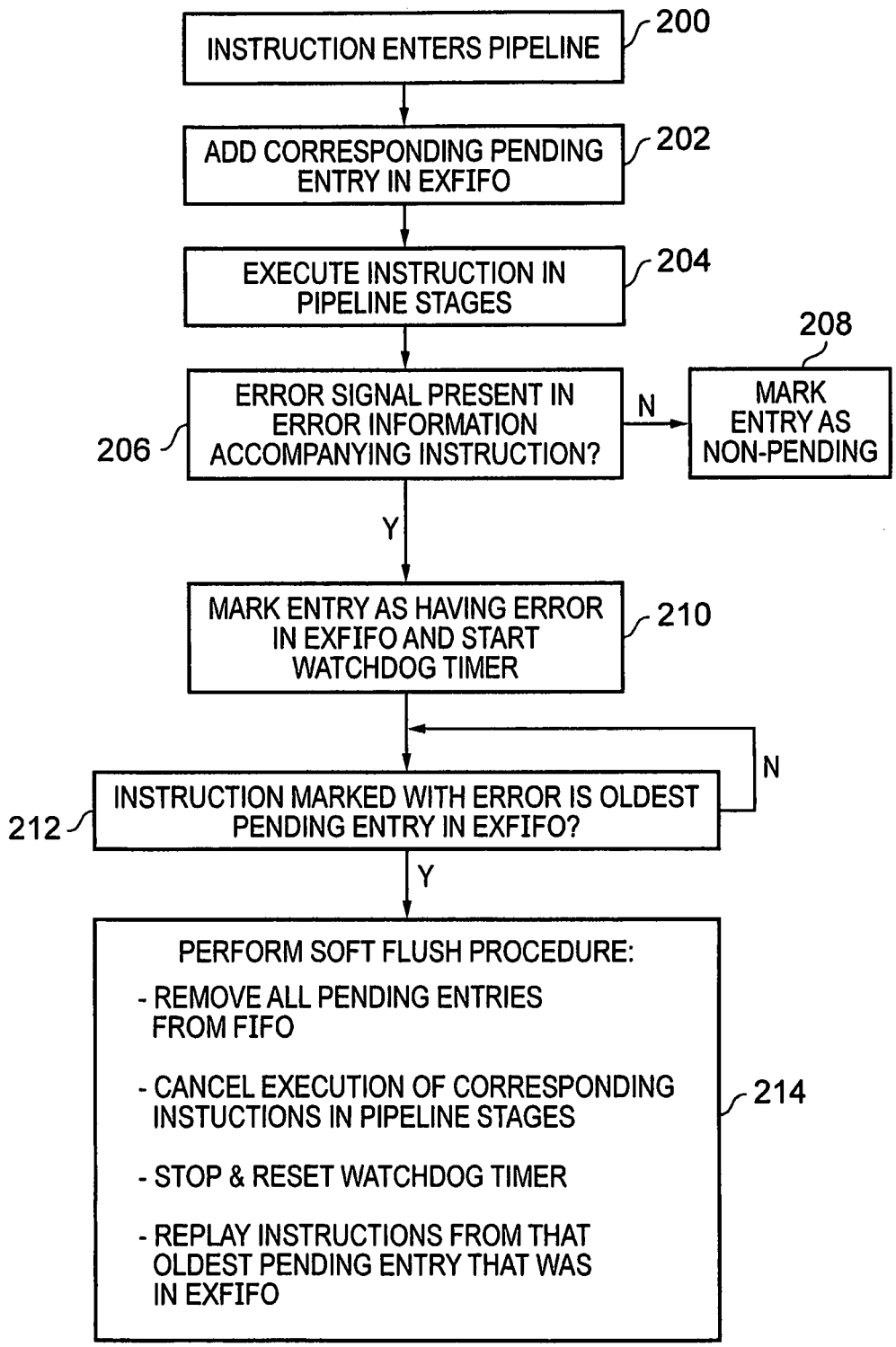
FIGS. 5A-5C schematically illustrates a series of steps which may be taken, at least partially in parallel, in one embodiment.
Figure 5B:
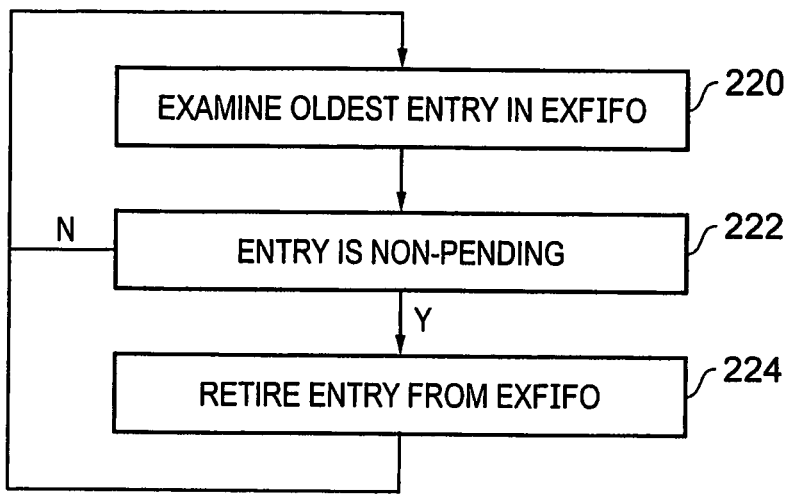
Figure 5C:
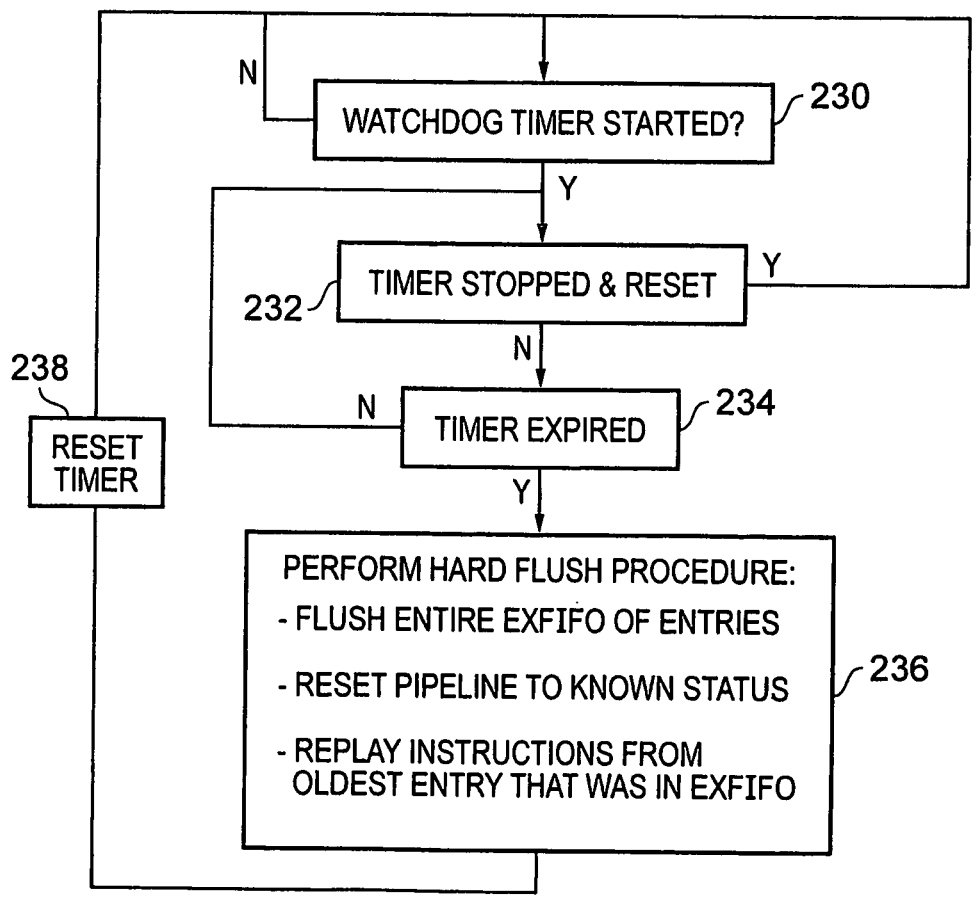

FIGS. 5A, 5B and 5C outline an example series of steps which may be taken in a data processing apparatus according to one embodiment. It should be understood that the sequence of steps illustrated in FIGS. 5A, 5B and 5C may, at least in part, take place simultaneously. Starting with FIG. 5A, a new instruction enters the pipeline at step 200 and at step 202 a corresponding pending entry is made in the EXFIFO. The instruction is then executed in the pipeline stages of the execution pipeline as represented by step 204. It should be understood that FIG. 5A only discusses the execution of a particular instruction and of course in practice as one instruction is being executed in the pipeline stages, further instructions will be entering the pipeline and have corresponding entries made in the EXFIFO. However, for clarity of discussion FIG. 5A only refers to the progress of a single instruction. Once the instruction has completed execution through the instruction pipeline then at step 206 it is determined if the error signal is present in the error information accompanying this instruction. If no error signal is present then the corresponding entry in the EXFIFO is marked as non-pending in step 208 (i.e. the valid bit is set and the error is marked as zero) and this entry will be retired from the EXFIFO when it becomes the oldest non-pending entry.

However, if the error signal is present in the error information accompanying this instruction then at step 210 the corresponding entry in the EXFIFO is marked as having an error and the watchdog timer is started. Note that this corresponds to the embodiments discussed with reference to FIG. 2 rather than that discussed with reference to FIG. 4. Further discussion of the watchdog timer can be found below with reference to FIG. 5C.

Then at step 212 it is determined if the oldest pending entry in the EXFIFO is marked with an error. If it is not then the flow (which it should be recalled is only describing actions related to this particular instruction) loops upon itself at this step until older pending entries in the EXFIFO are resolved. Of course, as the present invention recognises it is possible for older instructions to never resolve which (as discussed below with reference to. FIG. 5C will result in a hard flush being carried out). Once the instruction under consideration in FIG. 5A becomes the oldest pending entry in the EXFIFO the fact that it is marked with an error causes a soft flush procedure (step 214) to be carried out. The soft flush procedure removes all pending entries from the EXFIFO, cancels execution of the corresponding instructions in the pipeline stages, stops and resets the watchdog timer and replays instructions from the oldest pending entry that was in the EXFIFO, i.e. the instruction under consideration in FIG. 5A.

FIG. 5B briefly explains the procedure via which entries in the EXFIFO are retired. At step 220 the oldest entry in the EXFIFO is examined and if at step 222 it is determined that this oldest entry is non pending then at step 224 it is retired from the EXFIFO. If at step 222 it is determined that the oldest entry in the EXFIFO is not non-pending then the flow loops back to step 220 at the next processing cycle.

FIG. 5C begins at step 230 waiting for the watchdog timer to be started. Once the watchdog timer is started then the loop of steps 232 and 234 is following, waiting for the timer to expire (step 234). If at any time when following this loop the timer is stopped and reset then the flow returns to step 230 waiting for the watchdog timer to be started. If it is determined at step 234 that the timer has expired then the flow proceeds to step 236 where the hard flush procedure is carried out. This hard flush procedure flushes the entire EXFIFO of entries, resets the pipeline to a known configurational status and replays instructions from the oldest entry that was in the EXFIFO before the hard flush was carried out. The flow then loops back to step 230 (via step 238 at which the timer is reset) to wait for the timer to be started.

In overall summary, a data processing apparatus executes instructions in a sequence of pipelined execution stages. An error detection unit twice samples a signal associated with execution of an instruction and generates an error signal if the samples differ. An exception storage unit maintains an age-ordered list of entries corresponding to instructions issued to the execution pipeline and can mark an entry to show if the error signal has been generated in association with that instruction. A timer unit is responsive to generation of the error signal to initiate timing of a predetermined time period. An error recovery unit initiates a soft pipeline flush procedure if an oldest pending entry in the list has said error marker stored in association therewith and initiates a hard pipeline flush procedure if said predetermined time period elapses, said hard flush procedure comprising resetting said pipeline to a predetermined state.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus comprising:
an execution pipeline configured to execute instructions in a sequence of pipelined execution stages;
an error detection unit configured to generate a first sample of a signal associated with execution of an instruction in said execution pipeline, configured to generate a second sample of said signal after a delay period, and configured to generate an error signal associated with said instruction if said first sample and said second sample differ;
an exception storage unit configured to maintain an age-ordered list of entries corresponding to instructions issued to said execution pipeline for execution, each entry initially defined as pending,
said exception storage unit configured to store in association with each entry an error marker if said error signal has been generated in association with the instruction corresponding to that entry,
said exception storage unit configured to mark an entry as non-pending when said execution pipeline indicates that an instruction associated with said entry has completed execution without said error signal being generated in association therewith,
and said exception storage unit configured to sequentially retire oldest non-pending entries from said list;
a timer unit configured to be responsive to generation of said error signal to initiate timing of a predetermined time period;
an error recovery unit configured to cause a soft flush procedure to be carried out if an oldest pending entry in said list has said error marker stored in association therewith, said soft flush procedure comprising removing all pending entries from said list, cancelling execution in said pipelined execution stages of instructions corresponding to said pending entries, cancelling said timing of said predetermined time period and restarting execution of said instructions at an instruction corresponding to said oldest pending entry; and
said error recovery unit configured to cause a hard flush procedure to be carried out if said predetermined time period elapses, said hard flush procedure comprising removing all entries from said list, resetting said pipeline to a predetermined state and restarting execution of said instructions at an instruction corresponding to an oldest entry in said list.

2. A data processing apparatus as claimed in claim 1, comprising a plurality of error detection units.

3. A data processing apparatus as claimed in claim 2, wherein said plurality of error detection units are coupled together to generate a final error signal which indicates that said error signal has been generated in at least one of said plurality of error detection units.

4. A data processing apparatus as claimed in claim 3, wherein said plurality of error detection units are arranged in said sequence of pipelined execution stages respectively.

5. A data processing apparatus as claimed in claim 3, wherein said error signal is comprised in an error status item and said execution pipeline is configured to propagate said error status item through said sequence of pipelined execution stages in association with said instruction.

6. A data processing apparatus as claimed in claim 5, wherein said error marker is stored in dependence on said final error signal comprised in said error status item at a conclusion of said execution pipeline.

7. A data processing apparatus as claimed in claim 6, wherein said timer unit is configured to be responsive to presence of said final error signal at said conclusion of said execution pipeline to initiate timing of said predetermined time period.

8. A data processing apparatus as claimed in claim 6, wherein said timer unit is configured to be responsive to storage of said error marker to initiate timing of said predetermined time period.

9. A data processing apparatus as claimed in claim 2, wherein said timer unit is configured to be responsive to generation of said error signal from any of said plurality of error detection units to initiate timing of said predetermined time period.

10. A data processing apparatus as claimed in claim 1, wherein said exception storage unit is configured to sequentially retire said oldest non-pending entries from said list on a per-processing cycle basis.

11. A data processing apparatus as claimed in claim 1, wherein said data processing apparatus is a real-time data processing apparatus and said predetermined time period is preset in dependence on a clock cycle length of said execution pipeline.

12. A data processing apparatus as claimed in claim 1, wherein execution of said instructions comprises access to a peripheral device of said data processing apparatus and said predetermined time period is preset in dependence on a maximum latency of said peripheral device.

13. A data processing apparatus as claimed in claim 1, wherein said predetermined time period is hardwired.

14. A data processing apparatus as claimed in claim 1, wherein said predetermined time period is settable by software.

15. A data processing apparatus as claimed in claim 1, wherein said error detection unit is arranged in control logic associated with said execution pipeline and said signal is a control signal arranged to control operation of said execution pipeline.

16. A data processing apparatus as claimed in claim 15, wherein said error detection unit is arranged in interlock logic associated with said sequence of pipelined execution stages and said signal is an interlock signal passed between said pipelined execution stages.

17. A data processing apparatus as claimed in claim 15, wherein said signal is a validity signal passed between said pipelined execution stages, said validity signal arranged to indicate to a subsequent pipelined execution stage that signals arriving from a previous pipelined execution stage should be processed.

18. A data processing apparatus as claimed in claim 15, wherein said error detection unit is arranged in an issue stage of said sequence of pipelined execution stages and said signal is an instruction selection signal arranged to indicate a next instruction to be passed through said pipelined execution stages.

19. A data processing apparatus comprising:
execution pipeline means for executing instructions in a sequence of pipelined execution stages;
error detection means for generating a first sample of a signal associated with execution of an instruction in said execution pipeline means, for generating a second sample of said signal after a delay period, and for generating an error signal associated with said instruction if said first sample and said second sample differ;
exception storage means for maintaining an age-ordered list of entries corresponding to instructions issued to said execution pipeline for execution, each entry initially defined as pending,
said exception storage means for storing in association with each entry an error marker if said error signal has been generated in association with the instruction corresponding to that entry,
said exception storage means for marking an entry as non-pending when said execution pipeline means indicates that an instruction associated with said entry has completed execution without said error signal being generated in association therewith,
and said exception storage means for sequentially retiring oldest non-pending entries from said list;
timer means for initiating timing of a predetermined time period in response to generation of said error signal;
error recovery means for causing a soft flush procedure to be carried out if an oldest pending entry in said list has said error marker stored in association therewith, said soft flush procedure comprising removing all pending entries from said list, cancelling execution in said pipelined execution stages of instructions corresponding to said pending entries, cancelling said timing of said predetermined time period and restarting execution of said instructions at an instruction corresponding to said oldest pending entry; and
said error recovery means for causing a hard flush procedure to be carried out if said predetermined time period elapses, said hard flush procedure comprising removing all entries from said list, resetting said pipeline means to a predetermined state and restarting execution of said instructions at an instruction corresponding to an oldest entry in said list.

20. A method of data processing comprising:
executing instructions in a sequence of pipelined execution stages of an execution pipeline;
generating a first sample of a signal associated with execution of an instruction in said execution pipeline, generating a second sample of said signal after a delay period, and generating an error signal associated with said instruction if said first sample and said second sample differ;
maintaining in an exception storage unit an age-ordered list of entries, corresponding to instructions issued to said execution pipeline for execution, each entry initially defined as pending,
storing in association with each entry an error marker if said error signal has been generated in association with the instruction corresponding to that entry,
marking an entry as non-pending when said execution pipeline indicates that an instruction associated with said entry has completed execution without said error signal being generated in association therewith,
and sequentially retiring oldest non-pending entries from said list;
initiating timing of a predetermined time period in response to generation of said error signal;
carrying out a soft flush procedure if an oldest pending entry in said list has said error marker stored in association therewith, said soft flush procedure comprising removing all pending entries from said list, cancelling execution in said pipelined execution stages of instructions corresponding to said pending entries, cancelling said timing of said predetermined time period and restarting execution of said instructions at an instruction corresponding to said oldest pending entry; and
carrying out a hard flush procedure if said predetermined time period elapses, said hard flush procedure comprising removing all entries from said list, resetting said pipeline to a predetermined state and restarting execution of said instructions at an instruction corresponding to an oldest entry in said list.

* * * * *